United States Patent
Andersson et al.

(12) 
(10) Patent No.: US 6,193,175 B1
(45) Date of Patent: Feb. 27, 2001

(54) AGRICULTURAL PARTICULATE MATERIAL DELIVERY SYSTEM

(75) Inventors: Ingemar R. Andersson, Downers Grove, IL (US); Edward B. Adams, Goodview, VA (US); Lowell A. Norris, Norton Shores, MI (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/158,395

(22) Filed: Sep. 22, 1998

(51) Int. Cl.[7] .............................. A01C 7/06; A01C 19/00; A01C 3/06; E01C 19/20

(52) U.S. Cl. .................... 239/656; 239/676; 239/689; 222/608

(58) Field of Search ............................. 239/656, 676, 239/689, 305; 222/144.5, 52, 63, 211, 129, 608, 613, 624, 625, 145, 145.7, 145.8

(56) References Cited

U.S. PATENT DOCUMENTS

| | | | |
|---|---|---|---|
| Re. 35,100 | 11/1995 | Monson et al. | 111/130 |
| 3,153,494 | * 10/1964 | Heider | 222/145.7 |
| 3,543,704 | 12/1970 | Cordova et al. | 111/52 |
| 3,762,603 | 10/1973 | Bauman et al. | 221/211 |
| 3,848,552 | 11/1974 | Bauman et al. | 111/77 |
| 3,860,146 | 1/1975 | Bauman et al. | 221/211 |
| 3,885,704 | 5/1975 | Lienemann et al. | 221/211 |
| 4,128,191 | 12/1978 | Frase et al. | 222/167 |
| 4,148,414 | 4/1979 | Parks, Jr. | 221/160 |
| 4,185,782 | * 1/1980 | Belrose | 239/663 |
| 4,234,105 | 11/1980 | Viramontes | 222/233 |
| 4,263,858 | 4/1981 | Dryer | 111/73 |
| 4,392,587 | * 7/1983 | Bourne | 239/656 |

(List continued on next page.)

OTHER PUBLICATIONS

PCT Form/ISA 220, International Search Report for Application, PCT/US98/04772; Jun. 24, 1998.

"Air Till Drill Systems, Concord"; sales brochure for Case Corporation; 1996.

"Precision Farm Equipment, firmly Planted for the Future, Concord"; sales brochure for Case Corporation; 1996.

The Terranova VRS Variable Rate System by N.W. Anderson, ASAE Paper No. 95–1754 Jun. 1995.

10 Reasons Farmers Enlist Granules & Air–Spred to combat Their Weeds, by Gandy Company Manufacturers.

Hybrid No–Till Planter Shines, The Farmer/Dakota Farmer, pp. 10–11 Jan. 1996.

Dial In Seeding Rates, Varieties for Soybeans by Larry Reichenberger, pp. 24 A–D Farm Journal Mar. 1996.

Early Riser, 955 Series Cyclo Air Planters, 1996 Case Corporation.

Early Riser, Cyclo Air and Plate Planters RC Cultivators and Hoes, 1995 Case Corporation.

*Primary Examiner*—Andres Kashnikow
*Assistant Examiner*—Davis Hwu
(74) *Attorney, Agent, or Firm*—Foley & Lardner

(57) ABSTRACT

An agricultural particulate material delivery system for delivering metered agricultural particulate material to a growing medium includes first and second compartments adapted to contain different agricultural particulate materials, a material meter having an interior and a flow switching mechanism between the first and second compartments and the meter. The flow switching mechanism is actuatable between a first position in which the flow switching mechanism supplies material from the first compartment to the interior of the meter, a second position in which the flow switching mechanism supplies material from the second compartment to the interior of the meter and a third position in which the flow switching mechanism stops the supply of material from both the first and second compartments to the interior of the meter.

49 Claims, 10 Drawing Sheets

U.S. PATENT DOCUMENTS

| | | | |
|---|---|---|---|
| 4,473,016 | 9/1984 | Gust | 111/86 |
| 4,519,525 | 5/1985 | Wunschl et al. | 221/211 |
| 4,630,773 | 12/1986 | Ortlip | 239/1 |
| 4,758,119 | 7/1988 | Frase et al. | 221/211 |
| 5,064,099 * | 11/1991 | Iwako | 222/145.7 |
| 5,082,141 | 1/1992 | Martin et al. | 221/278 |
| 5,170,730 | 12/1992 | Swallow | 111/174 |
| 5,174,115 | 12/1992 | Jacobson et al. | 60/484 |
| 5,189,965 | 3/1993 | Hobbs et al. | 111/178 |
| 5,220,876 | 6/1993 | Monson et al. | 111/130 |
| 5,260,875 | 11/1993 | Tofte et al. | 364/424.07 |
| 5,323,721 | 6/1994 | Tofte et al. | 111/200 |
| 5,431,117 | 7/1995 | Steffens et al. | 111/180 |
| 5,592,889 | 1/1997 | Bourgault | 111/174 |
| 5,598,794 | 2/1997 | Harms et al. | 111/177 |
| 5,606,850 | 3/1997 | Nakamura | 56/10.2 A |
| 5,635,911 | 6/1997 | Landers et al. | 340/674 |
| 5,646,846 | 7/1997 | Bruce et al. | 364/424.07 |
| 5,655,468 | 8/1997 | Ledermann et al. | 111/164 |
| 5,684,476 | 11/1997 | Anderson | 340/988 |

* cited by examiner

FIG. 15
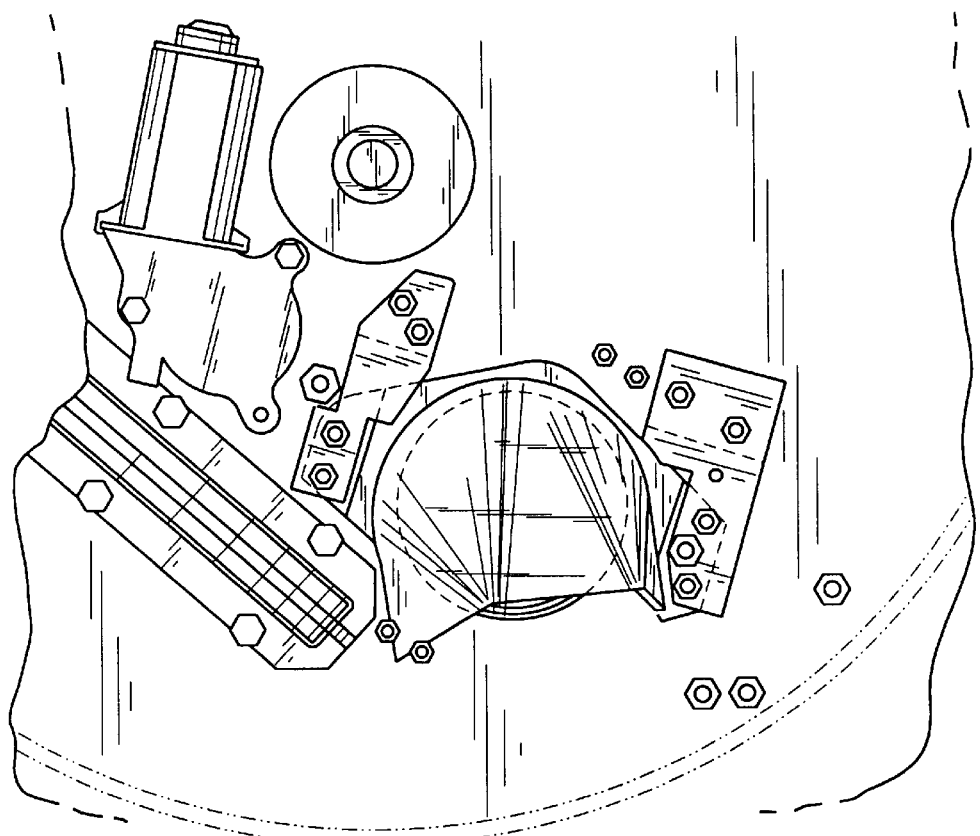
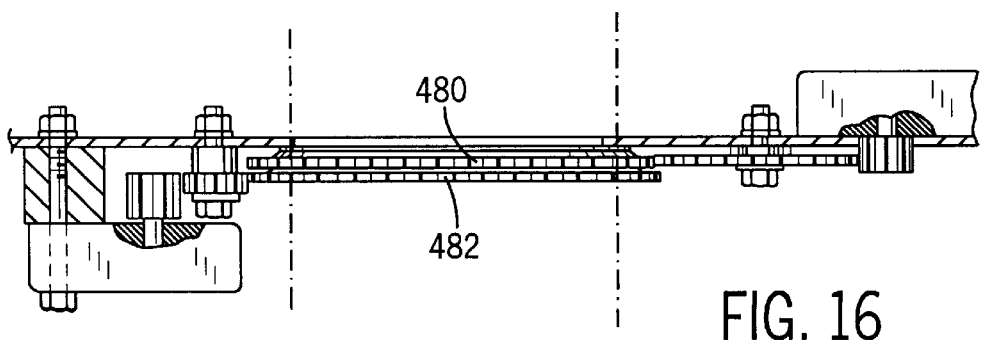
FIG. 16

AGRICULTURAL PARTICULATE MATERIAL DELIVERY SYSTEM

FIELD OF THE INVENTION

The present invention relates to systems for metering and delivering agricultural particulate materials to the ground or other surface being worked. In particular, the present invention relates to a system that selectively supplies different agricultural particulate materials to a metering device prior to the metering device delivering metered material to the ground or other surface being worked.

BACKGROUND OF THE INVENTION

In many agricultural applications, particulate materials such as seed, fertilizer, herbicide and insecticide are applied to the ground or other surface being worked. It is often necessary to precisely control and meter the application of the agricultural particulate materials to the surface. As a result, conventional material applicating systems generally include a hopper, bin or other structure which provides a compartment for containing or storing the material and a metering device which receives material from the compartment and which meters and delivers the material at a precisely controlled rate to the surface being worked.

In many fields, the surface being worked varies from location to location. For example, a single path across a field may traverse different terrains, different moisture levels, different nutritional levels, different insect populations and different weed populations. As a result, to optimize crop yield and to most efficiently and effectively use the applied agricultural particulate material, it is often necessary to vary not only the rate at which the agricultural particulate material is applied to the surface but also the specific type or variety of agricultural particulate material being applied to the surface. For example, when traveling through a wet spot in a field, it may be advantageous to switch from a first variety of seed to a second variety of seed which is more suited to the high moisture level. Unfortunately, switching between types of agricultural particulate material is extremely difficult and time consuming. Switching between different types of agricultural particulate material usually requires the operator to empty the existing material from the compartment and then manually refill the compartment with the other type of agricultural particulate material. Alternatively, other material delivery systems include multiple compartments, wherein each compartment has its own metering device or mechanism which delivers agricultural particulate material into a central delivery tube. Although such systems are capable of delivering different agricultural particulate materials to the surface being worked, such systems require individual metering devices for each compartment and for each type of material. As a result, such systems are space consuming and expensive.

Thus, there is a continuing need for a material delivery system which is capable of selectively metering and delivering different types of agricultural particulate material to the surface being worked using a single meter. There is also a continuing need for a system which can reliably and predictably switch between the application of different types of agricultural particulate material "on-the-go" without substantial mixing of different materials as the delivery system is transported across the field.

SUMMARY OF THE INVENTION

The present invention is directed to an agricultural particulate material delivery system for delivering metered agricultural particulate material to a growing medium. The delivery system includes first and second compartments adapted to contain different agricultural particulate materials, a material meter having an interior, and a flow switching mechanism between the first and second compartments and the meter. The flow switching mechanism is actuatable between a first position in which the flow switching mechanism supplies the material from the first compartment to the interior of the meter, a second position in which the flow switching mechanism supplies the material from the second compartment to the interior of the meter and a third position in which the flow switching mechanism stops the supply of material from both the first and second compartments to the interior of the meter.

According to one preferred aspect of the present invention, the material meter is configured to meter material to a plurality of rows in the growing medium. Preferably, the delivery system includes a plurality of chutes or tubes extending from the interior of the meter, wherein the plurality of chutes deliver metered material to each of the plurality of rows.

According to yet another aspect of the invention, the flow switching mechanism includes first and second conduits communicating between the first and second compartments, respectively, and the interior of the meter and a gate mechanism between the first and second compartments and the interior of the meter. The gate mechanism is actuatable between a first position in which the flow switching mechanism supplies the material from the first compartment to the interior of meter, a second position in which the flow switching mechanism supplies the material from the second compartment to the interior of the meter, and a third position in which the flow switching mechanism stops the supply of material from both the first and second compartments to the interior of the meter. The gate mechanism preferably includes a first gate between the first compartment and the interior of the meter, wherein the first gate is selectively movable between a first position in which the first gate closes the first conduit and a second position in which the first conduit is opened. In the exemplary embodiment, the first gate closes the second conduit in the second position. Furthermore, in the exemplary embodiment the first gate rotates between the first and second positions.

In the exemplary embodiment, the first gate is configured for being rotated about an axis and includes a circular disc having an outer perimeter. The disc includes an eccentric aperture and an eccentric closing portion. Rotation of the disc alternately positions the eccentric aperture and the eccentric closing portion across the first conduit.

According to one aspect, the delivery system includes means in engagement with the outer perimeter of the disc for rotating the disc about the axis. Preferably, the outer circumference of the disc includes a plurality of teeth, wherein the means for rotating the disc includes a rotatably driven gear in engagement with the plurality of teeth.

According to yet another aspect of the present invention, the delivery system includes an actuator coupled to the gate to selectively move the first gate between the first and second positions. In the exemplary embodiment, the delivery system includes a motor operatively coupled to the first gate to selectively move the first gate between the first and second positions.

According to yet another aspect, the delivery system includes a second gate between the second compartment and the meter. The second gate is selectively movable between a third position in which the second gate closes the second conduit and a fourth position in which the second conduit is opened. Preferably, the second gate rotates between the third and fourth position. In the exemplary embodiment, the disc is preferably rotated by means in engagement with the outer circumference of the second circular disc. The outer circumference preferably includes a plurality of teeth, wherein the means for rotating the disc includes a rotatably driven gear in engagement with the plurality of teeth.

According to yet another aspect of the present invention, the delivery system includes an actuator coupled to the second gate for selectively moving the gate between the third and fourth positions. In the exemplary embodiment, the delivery system includes a second motor operatively coupled to the second gate for selectively moving the second gate between the third and fourth positions.

According to yet another aspect of the present invention, the first and second gates rotate about the same axis such that the disks overlap. Preferably, the gate mechanism extends adjacent the meter. In particular, the first gate extends adjacent the meter.

The present invention is also directed to an agricultural particulate material delivery system for delivering metered agricultural particulate material to a growing medium. The delivery system includes first and second compartments adapted to contain different agricultural particulate materials, a material meter having an interior, a flow switching mechanism between the first and second compartments and the meter, an actuator coupled to the flow switching mechanism, a sensor proximate to the interior of the meter and a control circuit coupled between the actuator and the sensor. The flow switching mechanism is actuatable between a first position in which the flow switching mechanism supplies the material from the first compartment to the interior of the meter, a second position in which the flow switching mechanism supplies the material from the second compartment to the interior of the meter and a third position in which the flow switching mechanism stops the supply of material from both the first and second compartments to the interior of the meter. The sensor is configured to generate a material signal representing an amount of material within the meter. The control circuit is configured to generate a control signal for moving the actuator to actuate the flow switching mechanism between the first, second and third positions based upon the sensed amount of material within the meter.

The present invention is also directed to an agricultural particulate material delivery system for delivering metered agricultural particulate material to a growing medium. The delivery system includes first and second compartments adapted to contain different particulate materials, a material meter having an interior, first and second conduits communicating between the first and second compartments, respectively, and the interior of the meter, a first gate between the first conduit and the meter, a second conduit between the second compartment and the meter, and at least one actuator coupled to the first and second gates. The first gate is selectively movable between a first position in which the first gate closes the first conduit and a second position in which the first conduit is opened. The second gate is selectively movable between a third position in which the second gate closes the second conduit and a fourth position in which the second conduit is open. The at least one actuator selectively moves the first gate between the first and second positions, and selectively moves the second gate between the third and fourth positions.

The present invention is also directed to a planter for delivering seed to a plurality of rows. The planter includes a frame, a plurality of grounding engaging motor members coupled to the frame for supporting the frame above the ground being worked, at least one hopper coupled to the frame and providing first and second compartments adapted to contain seed, a material meter coupled to the frame and having an interior, first and second conduits communicating between the first and second compartments, respectively, and the interior of the meter and a gate mechanism between the first and second compartments and the meter. The seed meter is adapted to meter seed to at least one row of a plurality of rows. The gate mechanism is configured to selectively open and close the first and second conduits to selectively deliver seed from the first and second compartments, respectively, to the meter.

BRIEF DESCRIPTION OF THE DRAWINGS

FIG. 15 is a sectional view of the material delivery system of FIG. 14 from an opposite side of FIG. 14.

FIG. 16 is a sectional view of the material delivery system of FIG. 14 taken along lines 16—16.

DETAILED DESCRIPTION OF THE PREFERRED EMBODIMENTS

Figure 1:
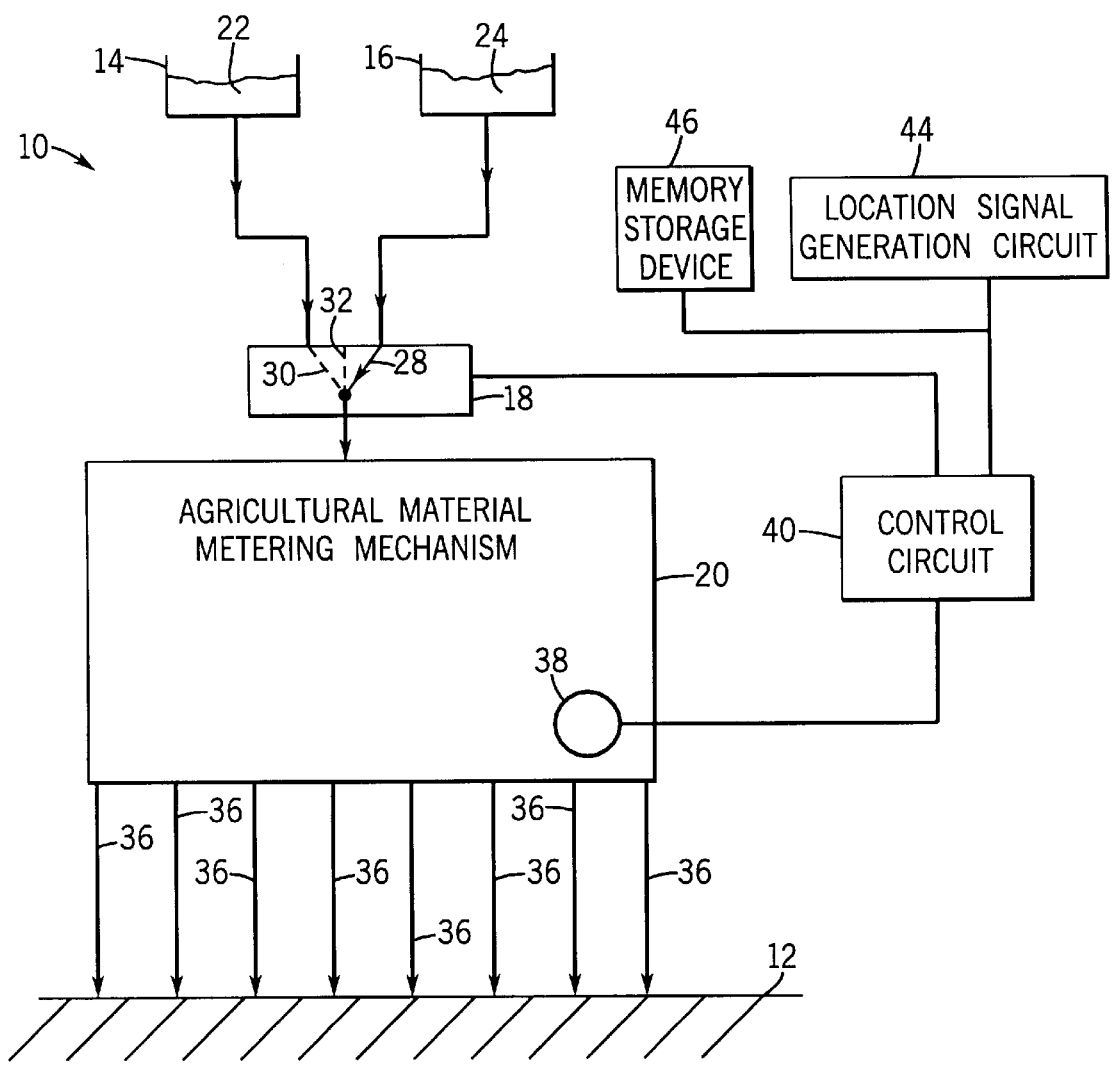
FIG. 1 schematically illustrates an agricultural particulate material delivery system of the present invention.
Figure 2:
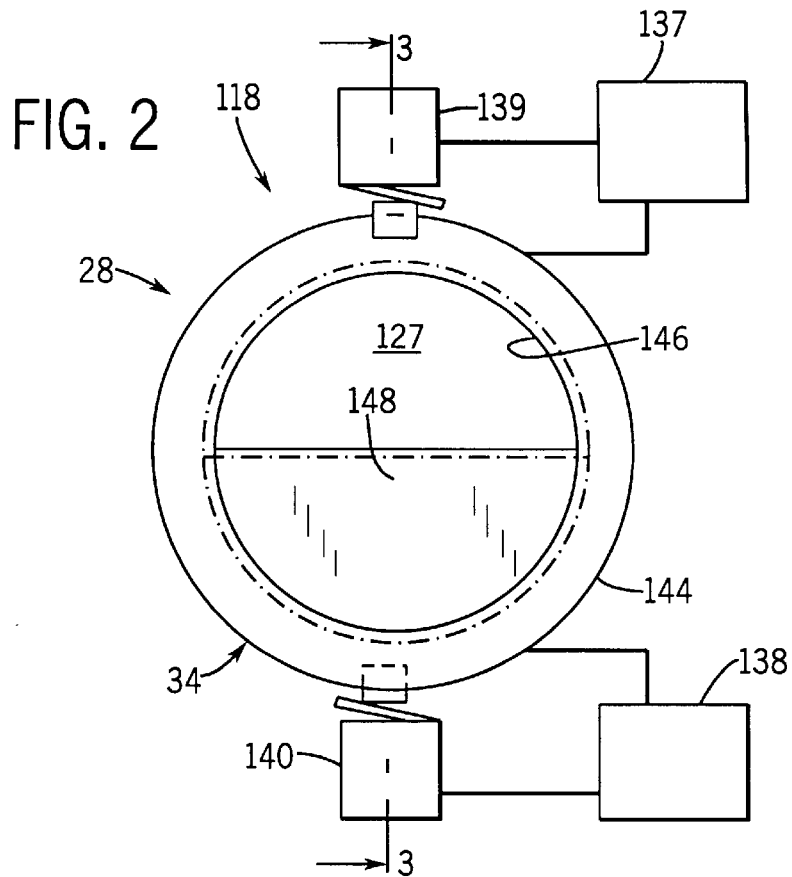
FIG. 2 schematically illustrates a first embodiment of a flow switching mechanism for use in the delivery system of FIG. 1, wherein the flow switching mechanism is in a first position.
Figure 3:
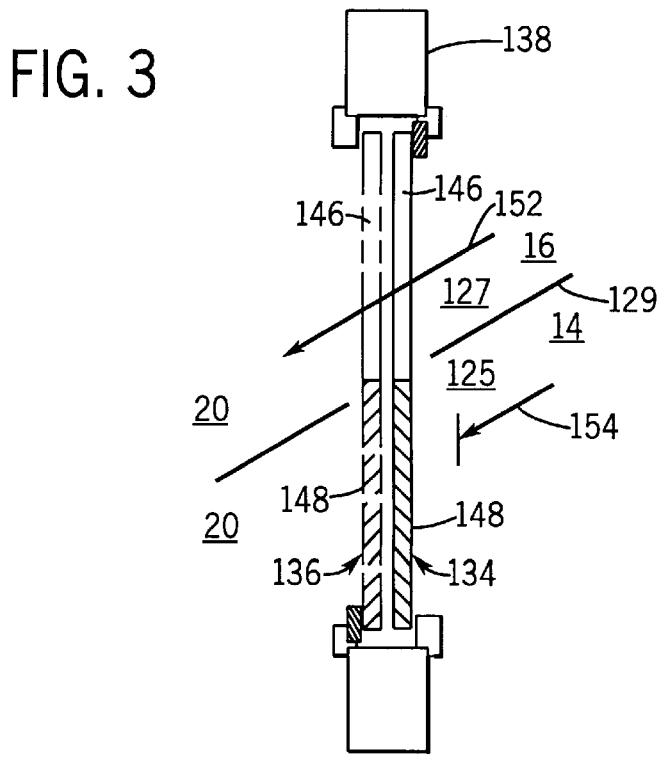
FIG. 3 is a sectional view of the flow switching mechanism of FIG. 2 taken along lines 3—3.

FIG. 1 schematically illustrates agricultural particulate material delivery system 10 which delivers different agricultural particulate material such as seed, fertilizer, herbicide or insecticide to growing medium 12 which preferably comprises soil. Agricultural particulate material delivery system 10 generally includes compartments 14, 16, a flow switching mechanism 18 and an agricultural particulate material meter 20. Compartments 14 and 16 provide containers or at least partial enclosures for containing different agricultural particulate materials 22, 24. Such different agricultural particulate materials may comprise different varieties of seed, different types of fertilizers, insecticides or herbicides, or different blends of seeds or different blends of fertilizers, insecticides or herbicides. Compartments 14, 16 may be provided by a single bifurcated hopper or multiple individual hoppers.

Flow switching mechanism 18 is coupled between compartments 14, 16, and agricultural particulate material meter 20. Flow switching mechanism 18 selectively supplies agricultural particulate material from either compartment 14 or compartment 16 to the interior of agricultural particulate material meter 20. As schematically illustrated in FIG. 1, flow switching mechanism 18 is selectively positionable between a first position 28 in which mechanism 18 supplies agricultural particulate material 24 from compartment 16 to meter 20 and a second position 30 (shown in dashed lines) in which flow switching mechanism 18 supplies agricultural particulate material 22 from compartment 14 to meter 20. As a result, a single meter 20 may be used to selectively deliver different types of agricultural particulate material 22, 24 to growing medium 12. For example, when traveling through a wet spot in a field, flow switching mechanism 18 may be actuated to switch delivery from a first variety of seed to a second variety of seed. With system 10, this is achieved by simply actuating flow switching mechanism 18 from a first position to a second position. Flow switching mechanism 18 is preferably actuated by electronic controls located at the operator station of the vehicle and/or implement (not shown) carrying system 10 across growing medium 12. In addition to being actuatable between a first position 28 in which mechanism 18 supplies meter 20 with material from compartment 16 and a second position in which flow switching mechanism 18 supplies meter 20 the material from compartment 14, flow switching mechanism 18 is also actuatable to a third position 32 in which flow switching mechanism 18 cessates the delivery of agricultural particulate material from either compartments 14 or 16 to meter 20. As a result, agricultural particulate material meter 20 is able to substantially exhaust its current inventory of agricultural particulate material from one of compartments 14, 16 before receiving another supply of agricultural particulate material from the other of compartments 14, 16. This third position 32 for flow switching mechanism 18 is preferably situated between first position 28 and second position 30 such that flow switching mechanism 18 must be actuated past this third position 32 when switching or alternating from one compartment to another.

Flow switching mechanism 18 preferably comprises a gate mechanism having at least one gate selectively movable so as to interrupt the flow of material from either or both of compartments 14, 16 to meter 20. Alternatively, flow switching mechanism 18 may comprise other various channeling or valve structures or mechanisms.

Agricultural particulate material meter 20 meters agricultural particulate material at a controlled rate to growing medium 12. Agricultural particulate material meter 20 is preferably configured for delivering agricultural particulate material to growing medium 12 in a plurality of spaced rows as indicated by arrows 36. Alternatively, meter 20 may be configured to meter agricultural particulate material to a single row or to a general non-row area of growing medium 12. Agricultural particulate material meter 20 preferably comprises a conventionally known meter configured for metering seed to growing medium 12. Alternatively, agricultural particulate material meter 20 may be configured for metering fertilizer, insecticide or herbicide to growing medium 12.

As further shown by FIG. 1, delivery system 10 additionally includes the optional features of sensor 38 and control circuit 40. Sensor 38 is positioned proximate to the interior of material meter 20. Sensor 38 is configured to generate a material signal representing an amount of agricultural particulate material within meter 20. Sensor 38 preferably includes one or more individual sensor elements positioned adjacent to the interior of meter 20 for sensing a level of material within meter 20. Alternatively, sensor 38 may comprise other sensor devices for sensing material flow into or from meter 20 or material weight within meter 20 in lieu of material presence so as to generate a material signal representing an amount of material within meter 20. The material signal generated by sensor 38 is transmitted to control circuit 40.

Control circuit 40 is operably coupled between sensor 38 and flow switching mechanism 18. Control circuit 40 is preferably mounted to a tractor or other vehicle (not shown) pulling the implement (not shown) in which delivery system 10 is employed. Control circuit 40 comprises a digital circuit programmed or otherwise configured in a conventionally known manner so as to generate a control signal for moving flow switching mechanism 18 between the first position 28, the second position 30 and the third position 32 based upon the sensed amount of material within meter 20 as indicated by the material signal received from sensor 38.

In the exemplary embodiment, control circuit 40 is programmed or otherwise configured to estimate to a relatively high degree of certainty the time at which the existing material within meter 20 will be exhausted based upon the material signals received from sensor 38. The estimated exhaustion time is then used by control circuit 40 to determine when to actuate flow switching mechanism 18 between the first position 28, the second position 30 and the third position 32. For example, although most of a field may be planted with a first variety of seed, the operator may desire to plant a second variety of seed in a known wet spot. Further, to insure that only the second variety of seed will be planted in the wet spot, it will be necessary to exhaust the existing volume or inventory of the first variety in meter 20 just prior to reaching the wet spot. Accordingly, flow switching mechanism 18 must be actuated from a first position 28 to the third position 32 in a sufficient amount of time prior to reaching the wet spot to enable most if not all of the first variety within meter 20 to be exhausted and not too early such that the first variety of seed within meter 20 is exhausted well before reaching the wet spot such that a portion of field would remain unplanted or planted with an undesirable second variety best suited only for wet conditions. As will be appreciated, various other conditions may also necessitate the need to customize the application of particulate material. These conditions include, but are not limited to, different terrains, different nutritional levels, different insect populations and different weed populations.

Control circuit 40 is configured to operate in a manual mode or an automatic mode. When control circuit 40 is in the manual mode, control circuit 40 generates a visual display indicating the amount of agricultural particulate material within meter 20, the amount of time until the material within meter 20 is exhausted, or the estimated distance traveled until the exhaustion of agricultural particulate material from meter 20. Control circuit 40 calculates this information based upon the present amount of material within meter 20 and the present flow rate to meter 20 or the rates at which material is supplied to meter 20 and is discharged from meter 20. These rates may be sensed or may be pre-estimated or predetermined. This information enables the operator to determine at which point flow switching mechanism 18 must be actuated from the first position 28 to either the second position 30 or the third position 32 so as to manually actuate mechanism 18 change the agricultural particulate material being delivered to a particular area of growing medium 12.

In the automatic mode, control circuit 40 automatically controls and actuates flow switching mechanism 18 from the first position 28 to the third position 32 and to the second position 30 to begin delivering a second variety of seed contained within compartment 14 to meter 20 as meter 20 is carried over the wet spot of growing medium 12. Control circuit 40 enables the operator to input the distance from the present location or a forthcoming time at which meter 20 must switch from delivering a first type of material to a second type of material to growing medium 12. Based upon this input, control circuit 40 then determines the timing at which flow switching mechanism 18 must be actuated between position 28, position 32 and second position 30 based upon the sensed amount of material within meter 20 and input, sensed or known flow rates of material to and from meter 20. Control circuit 40 then controls flow switching mechanism 18 to actuate flow switching mechanism 18 between first position 28, third position 32, and second position 30 at the appropriate times.

As further shown by FIG. 1, in the most preferred embodiment, system 10 also includes a location signal generation circuit 44 and a memory storage device 46 coupled to control circuit 40. Location signal generation circuit 44 is conventionally known and provides control circuit 40 with location data indicating the location of meter 20, the vehicle or the implement to which meter 20 is attached. In the exemplary embodiment, signal generation circuit 44 comprises a conventionally known GPS or DGPS system.

Memory storage device 46 is electronically coupled to control circuit 40 and signal generation circuit 44. Memory storage device 46 contains geo-referenced data relating to each location of growing medium 12. By way of example only, memory storage device 46 may contain information such as moisture level, seed populations, insect populations, yield history, crop history and the like. In this exemplary embodiment, control circuit 40 is additionally programmed or otherwise configured to automatically control flow switching mechanism 18 to supply meter 20 with appropriate agricultural particulate material depending upon particular characteristics of growing medium 12 as provided by memory storage device 46 for each location as provided by the signal generation circuit 44. As will be appreciated, control circuit 40, signal generation circuit 44 and memory storage device 46 may be provided by a single unit. Furthermore, as will be appreciated, control circuit 40 may comprise a corresponding analog circuit properly configured to perform one or more of the noted functions.

In the exemplary embodiment, control circuit 40, location signal generation circuit 44 and memory storage device 46 are provided as part of a core system including a data processing unit, a display and a location signal generation circuit as set forth and described on co-pending U.S. patent application Ser. No. 08/822,432, filed on Mar. 21, 1997 and entitled "Multiple Type Seed Dispensing System", which is presently assigned to Case Corporation, the full disclosure of which is hereby incorporated by reference. Memory storage device 46 preferably includes predetermined geo-referenced maps or data layers implemented by a geographical information system (GIS) database as also set forth and described in co-pending U.S. patent application Ser. No. 08/822,432.

FIGS. 2–7 illustrate a flow switching mechanism 118 for use with agricultural particulate material delivery systems 10 in lieu of flow switching mechanism 18. FIGS. 2 and 3 illustrate flow switching mechanism 118 in the first position 28 for supplying agricultural particulate material 24 to meter 20. FIGS. 4 and 5 illustrate flow switching mechanism 118 in the third position 32 in which mechanism 118 prevent agricultural particulate material from either compartment 14 or compartment 16 from being delivered to meter 20. FIGS. 6 and 7 illustrate mechanism 118 actuated to the second position 30 in which mechanism 118 delivers agricultural particulate material 22 to meter 20. Referring to FIGS. 2 and 3, flow switching mechanism 118 generally comprises a gate mechanism between compartments 14, 16 and meter 20. The gate mechanism opens and closes passageways or conduits 125, 127 (schematically illustrated as being separated by partition 129) communicating between compartments 14 and 16, respectively, and the interior of meter 20 so as to selectively supply material from compartments 14 and 16 to meter 20. Conduits 125 and 127 may comprise elongate panels, tubes or passageways extending from compartments 14 and 16 to meter 20. Alternatively, both compartments 14 and. 16 may be positioned adjacent to and in abutting contact with meter 20, wherein conduits 125 and 127 comprise openings in the walls of the structure defining compartments 14 and 16 and the structure defining meter 20.

Flow switching mechanism 118 generally includes gates 134, 136, actuators 137, 138 and position indicators 139, 140. Gates 134, 136 each comprise a generally circular disk 142 having an outer perimeter 144, an eccentric aperture 146 and an eccentric closing portion 148. Rotation of gates 134 and 136 repositions apertures 146 and closing portions 148 to open or close conduits 125 and 127. Gates 134 and 136 are selectively rotated by actuators 137 and 138 based upon position signals received by indicators 139 and 140, respectively, which are operably coupled to gates 134 and 136 proximate their outer perimeters 144. Actuators 137 and 138 preferably comprise conventionally known electric motors while position indicators 139 and 140 preferably comprise mechanical switches which are engaged and actuated by index structures extending from gates 134 and 136. Alternatively, actuators 137, 138 and position indicators 139, 140 may be replaced with conventionally known servomotors operably coupled to gates 134 and 136.

In the first position 28 shown in FIGS. 2 and 3, gate 134 is rotated to position its aperture 146 across conduit 127 such that agricultural particulate material 24 flows from compartment 16 into agricultural meter 20 as indicated by arrow 152. At the same time, closing portion 148 of gate 134 extends across conduit 125 which closes conduit 125 to block agricultural particulate material 22 from flowing into meter 20 as indicated by arrow 154. Actuator 138 positions gate 136 so that its aperture 146 is in alignment with aperture 146 of gate 134.

FIGS. 4 and 5 illustrate flow switching mechanism 118 actuated into the third position 32, wherein flow switching mechanism 118 prevents either agricultural particulate material 22 or 24 from flowing into meter 20. As indicated by arrow 156, actuator 138 rotates gate 136 relative to gate 134 so as to position closing portion 148 of gate 136 across conduit 127. As a result, closing portion 148 of gate 134 closes off conduit 125 while closing portion 148 of gate 136 closes off conduit 127 to prevent any material from either compartments 14 or 16 from flowing into meter 20. This enables the agricultural particulate material within meter 20 to be substantially exhausted from meter 20 prior to delivery of a different agricultural particulate material into meter 20.

Figure 4:
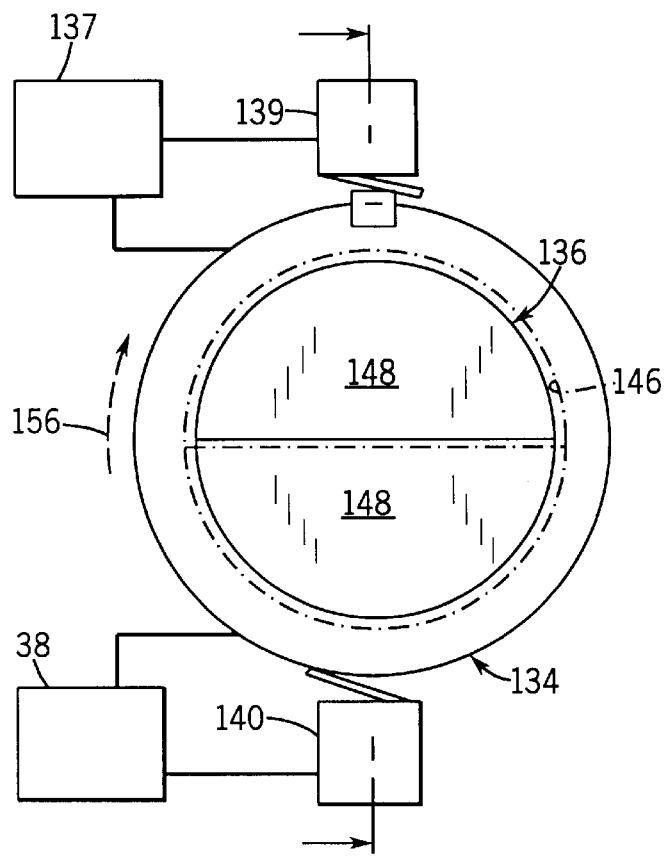
FIG. 4 is a schematic view of the flow switching mechanism of FIG. 2 in a second position.
Figure 5:
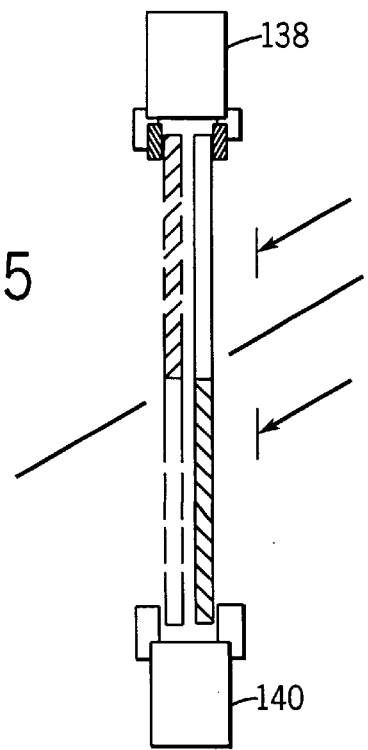
FIG. 5 is a sectional view of the flow switching mechanism of FIG. 4 taken along lines 5—5.
Figure 6:
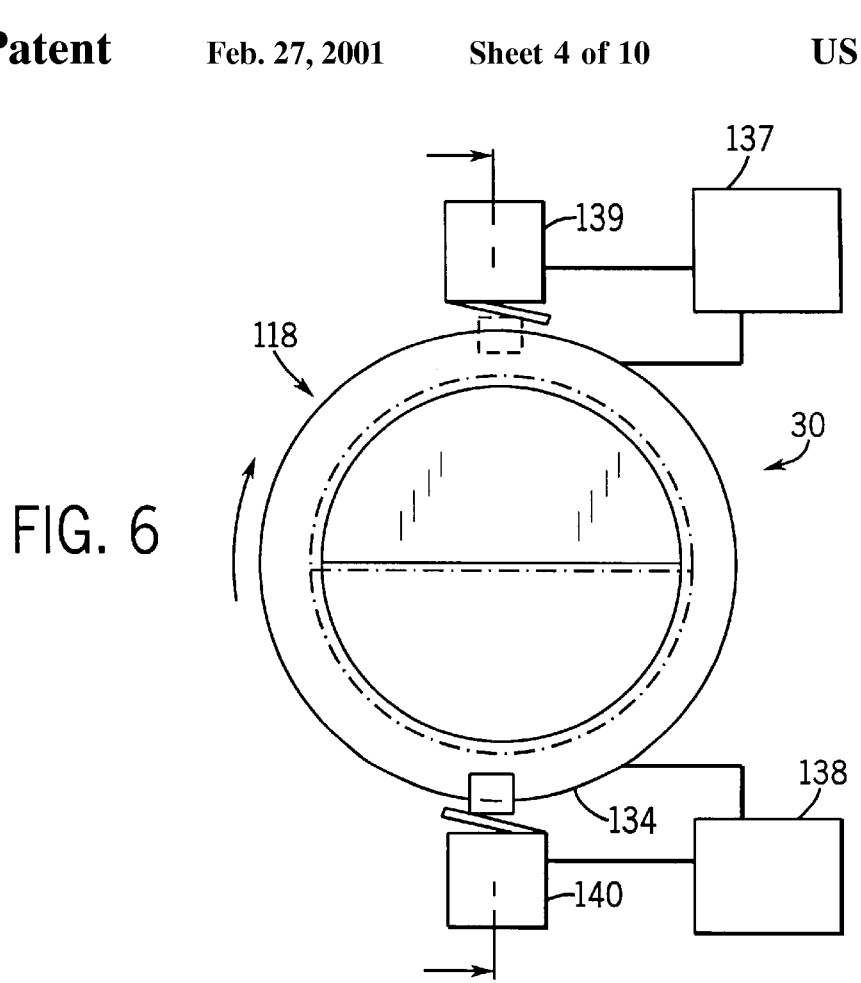
FIG. 6 is a schematic view of the flow switching mechanism of FIG. 2 in a third position.
Figure 7:
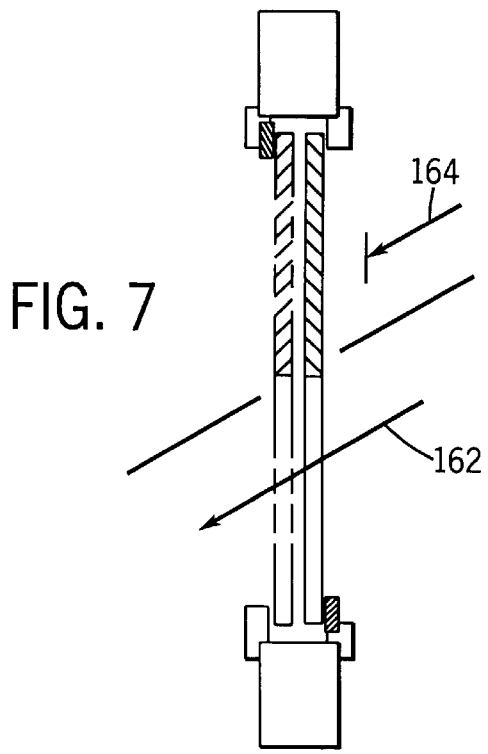
FIG. 7 is a sectional view of the flow switching mechanism of FIG. 6 taken along lines 7—7.

FIG. 6 schematically illustrates flow switching mechanism 118 in the second position 30 in which flow switching mechanism 118 is actuated so as to supply meter 20 with agricultural particulate material 22 from compartment 14. As shown by FIG. 6, to move from the third position 32 (shown in FIGS. 4 and 5) to the second position 30, actuator 138 rotates gate 134 to position aperture 146 across conduit 125 such that both apertures 146 of gates 134 and 136 are aligned across conduit 125 to enable agricultural particulate material 22 to flow through conduit 125 through apertures 146 into meter 20 as indicated by arrow 62. At the same time, both closing portions 148 of gates 134 and 136 extend across conduit 127 to block agricultural particulate material 24 from flowing from compartment 16 into meter 20 as indicated by arrow 164. Consequently, meter 20 is filled with only agricultural particulate material 22 from compartment 14.

Figure 8:
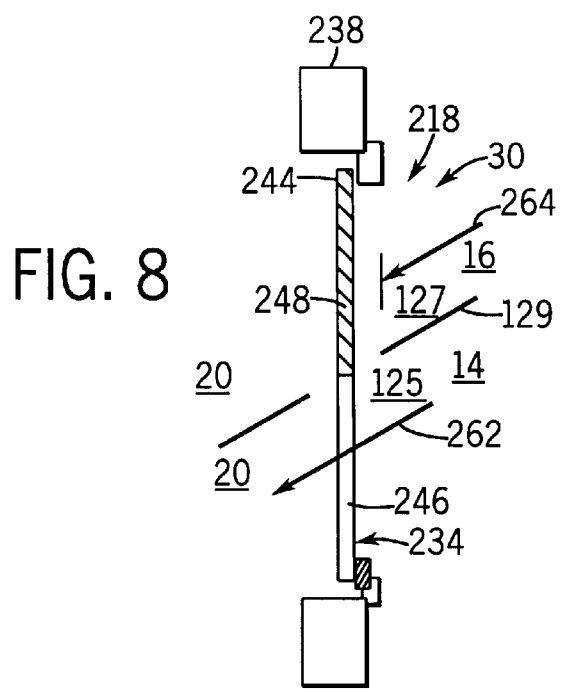
FIG. 8 is a sectional view of the second embodiment of the flow switching mechanism of FIG. 2, wherein the flow switching mechanism is in the first position.
Figure 9:
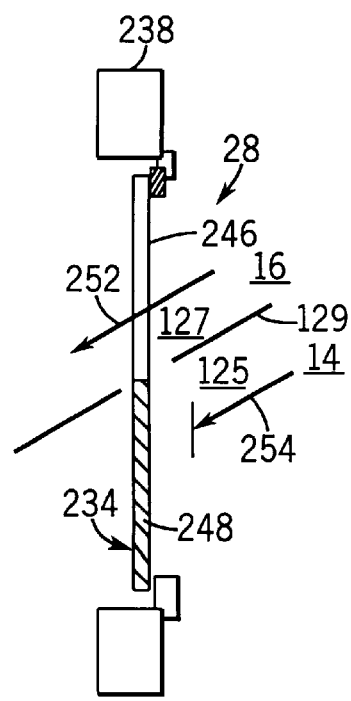
FIG. 9 is a sectional view of the flow switching mechanism of FIG. 8 in a second position.

FIGS. 8 and 9 schematically illustrate flow switching 218, an alternate embodiment of flow switching mechanism 118. Similar to flow switching mechanism 118, flow switching mechanism 218 is configured for use with system 10 in place of flow switching mechanism 18. Flow switching mechanism 218 comprises a gate mechanism between compartments 14, 16 and material meter 20. In particular, flow switching mechanism 218 is positioned across conduits 125 and 127 to selectively open and close conduits 125 and 127 to selectively supply material from compartments 14 and 16, respectively, to the interior of meter 20. Flow switching mechanism 218 includes a gate 234, an actuator (not shown) and a position indicator 238 coupled to gate 234. Gate 234 is substantially identical to gate 134 illustrated in FIGS. 2–7. Gate 234 comprises a generally circular disk having an outer perimeter 244, an eccentric aperture 246 and eccentric closing portion 248. Gate 234 is configured for being rotated by the actuator about a central axis and to selectively position aperture 246 and closing portion 248 across conduits 125 and 127.

FIG. 8 illustrates flow switching mechanism 218 and gate 234 actuated into the second position 30 in which aperture 246 is positioned across conduit 125 and closing portion 248 is positioned across conduit 127. As a result, gate 234 opens conduit 125 to allow agricultural particulate material 22 to flow through conduit 125 into agricultural particulate material meter 20 as indicated by arrow 262. At the same time, closing portion 248 closes off conduit 127 to prevent agricultural particulate material 24 from flowing through conduit 127 into meter as indicated by arrow 264.

FIG. 9 illustrates flow switching mechanism 218 and gate 234 actuated into the first position 28 in which gate 234 closes conduit 125 and opens conduit 127. In particular, in first position 28, aperture 246 is positioned to cross conduit 127 to permit agricultural particulate material 24 to flow therethrough from compartment 16 into agricultural particulate material meter 20 as indicated by arrow 252. At the same time, closing portion 248 is positioned across conduit 125 to prevent material 22 from flowing through conduit 125 into meter 20 as indicated by arrow 254. By selectively rotating gate 234 between the first position 28 and the second position 30, the actuator (not shown) selectively controls the supply of agricultural particulate material to meter 20.

Figure 10:
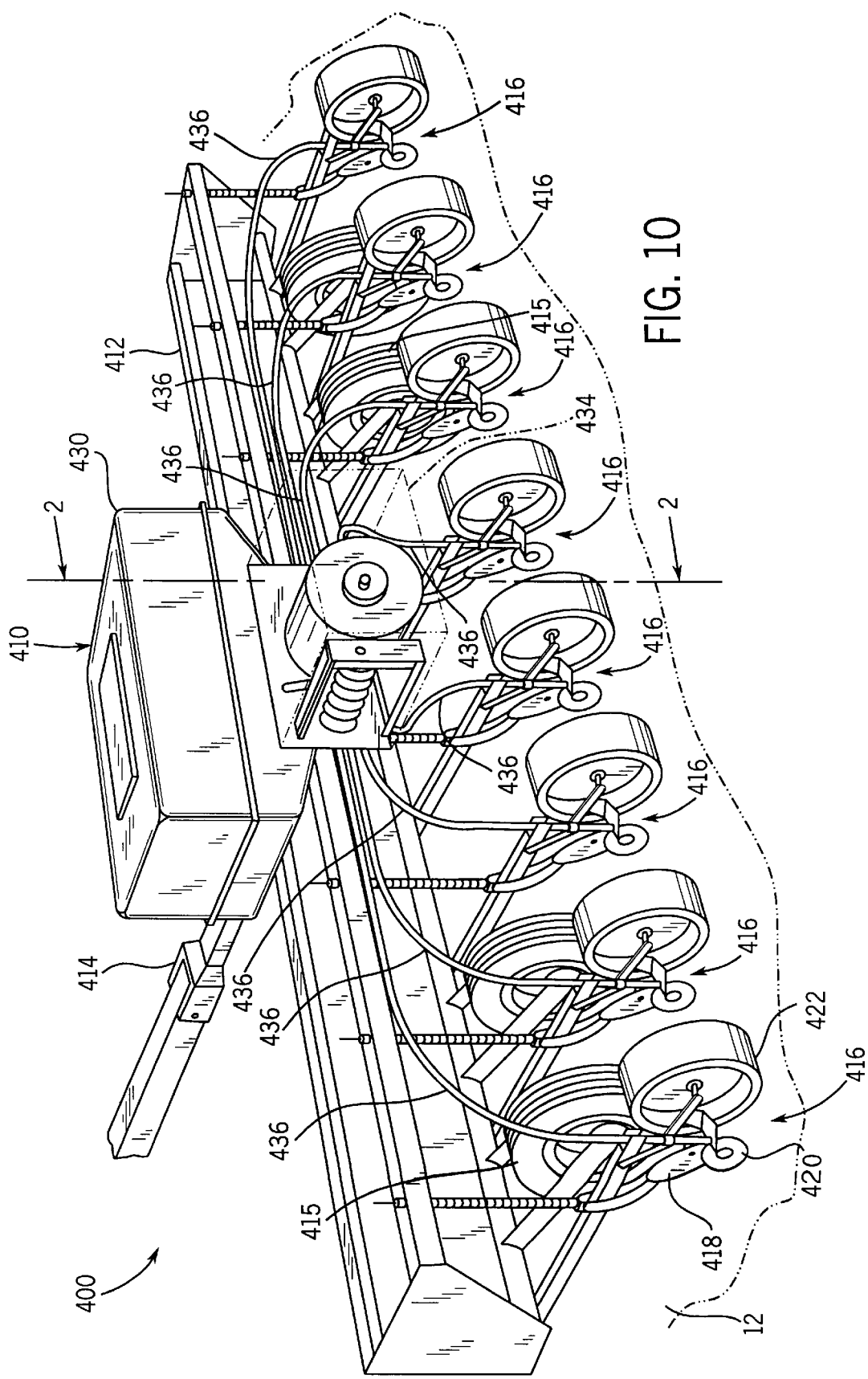
FIG. 10 is a perspective view of an agricultural implement including a second embodiment of the material delivery system of FIG. 1.

FIGS. 10–17 illustrate an agricultural implement 400 including agricultural particulate materials delivery system 410, an alternate embodiment of agricultural particulate material delivery system 10 shown in FIG. 1. As best shown by FIG. 10, in addition to including delivery system 410, agricultural implement 400 includes frame 412, hitch assembly 414, wheels 415 and discharge stations 416. Frame 412, also known as a tool bar, comprises an elongate rigid structure configured to support delivery system 410 and discharge stations 416. Frame 412 is supported above growing medium 12 by wheels 415 and is coupled to hitch assembly 414 at a forward end of implement 400. Hitch assembly 414 is conventionally known and configured for being pulled by a suitable vehicle, such as a tractor (not shown), across a field. In the exemplary embodiment illustrated, implement 400 comprises a planter. As will be appreciated, frame 412 may have various other configurations depending upon the particular type of implement in which delivery system 410 is employed.

Discharge stations 416 are mounted to frame 412 in a plurality of transversely spaced locations along frame 412. Discharge stations 416 are preferably bolted to frame 412 to enable the spacing between discharge stations 416 to be adjusted. Each discharge station 416 generally includes opposing furrow opening disks 418, which produce furrows in growing medium 12 into which seeds are individually dropped, trailing furrow closing disks 420 which close the furrow by covering the seeds with soil and press wheels 422 which further compress and compact the growing medium or soil above the seeds. As will be appreciated, the configuration of discharge stations 416 may vary depending upon the type of implement and the type of seed or other agricultural particulate material to be delivered to growing medium 12 by delivery system 410.

Figure 11:
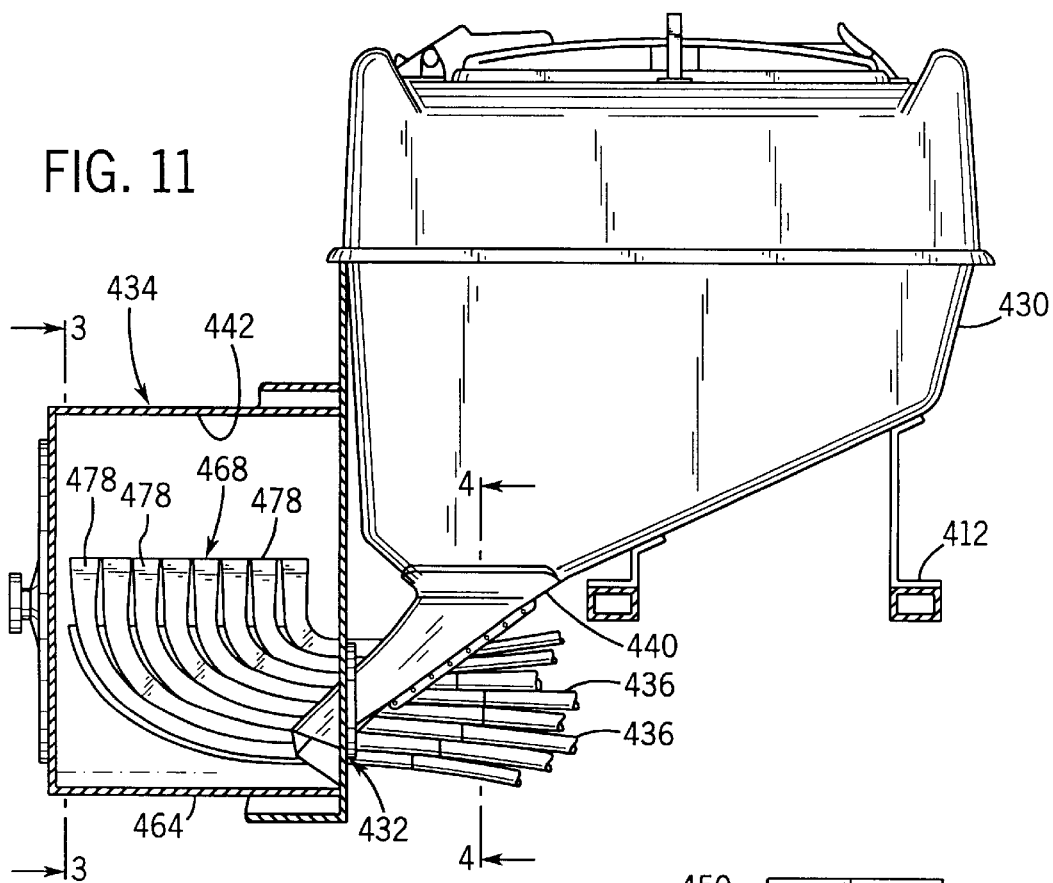
FIG. 11 is a fragmentary sectional view of the implement of FIG. 10 taken along lines 11—11.
Figure 12:
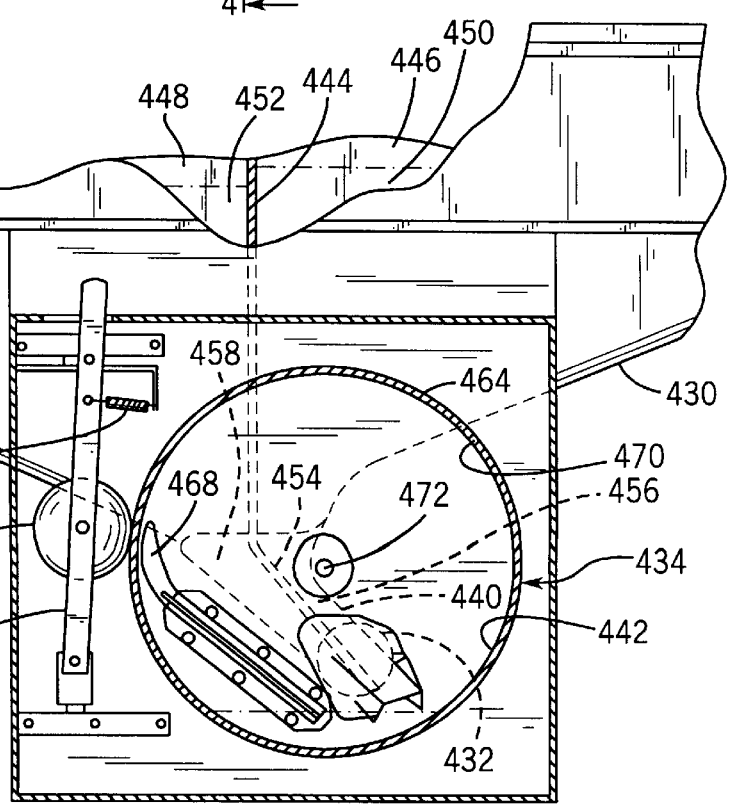
FIG. 12 is a fragmentary sectional view of the implement of FIG. 11 taken along lines 11—11.
Figure 13:
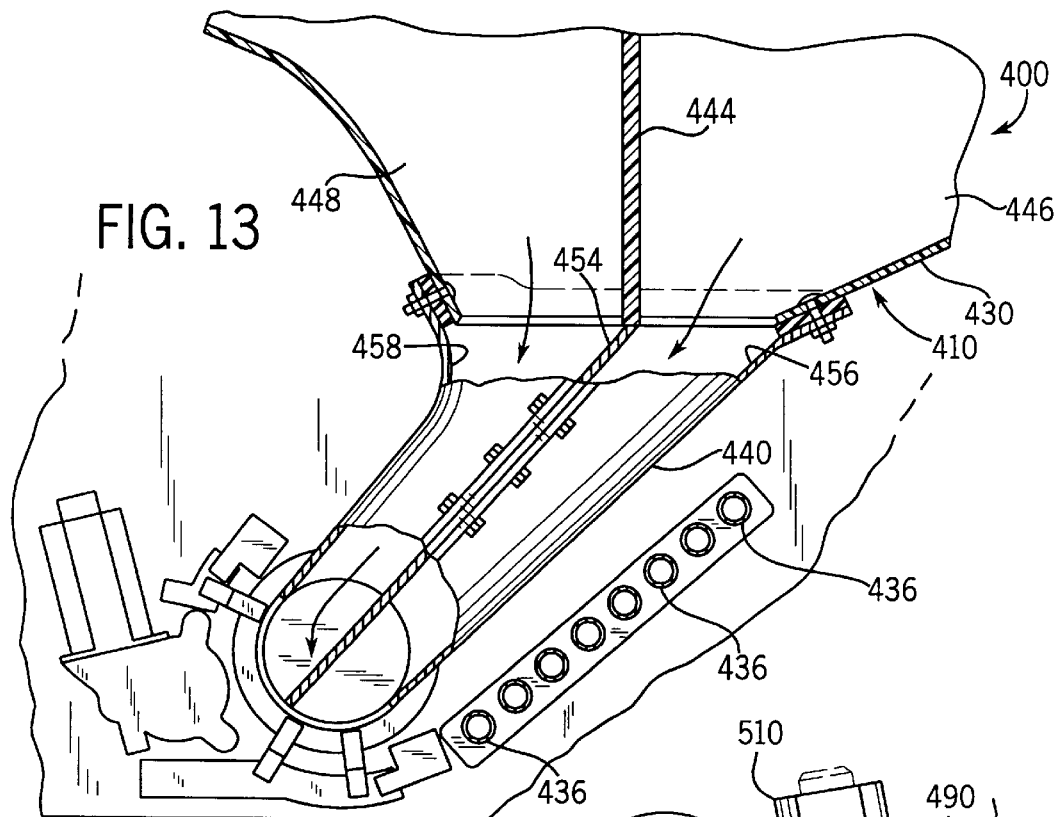
FIG. 13 is a fragmentary sectional view of the implement of FIG. 11 taken along lines 13—13.

Delivery system 410 supplies seed to discharge stations 416 and deposits the seed into the furrow created by furrow opening disks 418 prior to the furrow being closed by furrow closing disks 420. Delivery system 410 generally includes hopper 430, flow switching mechanism 432 (shown in FIGS. 11–17), material meter 434, and conveying tubes 436. FIGS. 11 and 12 illustrate delivery system 410 in greater detail. As shown by FIGS. 11 and 12, hopper 430 is connected to material meter 20 by an inclined delivery chute 440 which extends from a lower portion of hopper 430 and into an interior 442 of meter 20. As best shown by FIG. 12, hopper 430 and chute 440 are each preferably bifurcated or split by a dividing partitions 444 and 454. Partition 444 divides hopper 430 into a first compartment 446 and a second compartment 448 such that compartments 446 and 448 are adapted to contain and separate different agricultural seed 450 and 452, respectively. Delivery chute 440 includes a partition 454 which has an end aligned with partition 444 and which bifurcates chute 440 into a first conduit 456 and a second conduit 458. Conduits 456 and 458 extend from compartments 446 and 448, respectively, and communicate with interior 442 of meter 434.

Flow switching mechanism 432 extends across conduits 456 and 458 to control the flow and supply of seed 450 and 452 from compartments 446 and 448 into meter 434. Flow switching mechanism 432 is preferably coupled to and controlled by control circuit 40 illustrated and described with respect to FIG. 1. Flow switching mechanism 432 is also preferably configured for use with location signal generation circuit 44 and memory storage device 46, also described with respect to FIG. 1. Similar to flow switching mechanisms 18 and 118, flow switching mechanism 432 is configured for being actuated between a first position in which flow switching mechanism 432 supplies only material from compartment 446, a second position in which flow switching mechanism 432 only supplies material from compartment 448 and a third position in which flow switching mechanism 432 prevents material from either compartments 446 or 448 from being supplied to meter 434.

In the exemplary embodiment, flow switching mechanism 432 comprises a gate mechanism which selectively opens and closes both conduits 456 and 458 to allow or prevent the flow of seed 450 and 452 from compartments 446 and 448, respectively, into meter 434. In particular, in the first position, flow switching mechanism 432 closes conduit 458 while maintaining conduit 456 in an open condition to permit seed 450 from compartment 446 to flow into meter 434. In the second position, flow switching mechanism 432 closes conduit 456 while maintaining conduit 458 in an open state to allow seed 452 from compartment 448 to flow into meter 434. In the third position, flow switching mechanism 432 closes off both conduits 456 and 458 to prevent both seed 450 and 452 from flowing into meter 434. As a result, the existing seed within meter 434 may be exhausted prior to delivery of a different type of seed into meter 434. As a result, flow switching mechanism 432 enables different types of agricultural particulate materials, such as seed, to be supplied to growing medium 12 (shown in FIG. 10) as implement 400 is pulled across a field without substantial amounts of seed becoming blended or mixed together in meter 434 as types of seeds being planted are switched.

Material meter 434 preferably comprises a drum metering device, such as described in U.S. Pat. Nos. 4,519,525 and 5,655,468, assigned to Case Corporation, the full disclosures of which are hereby incorporated by reference. In particular, meter 434 generally includes selector drum 464, a conventionally known blower assembly (not shown) configured to pressurize the interior 442 of drum 464, rollers 466 and manifold 468. Drum 464 generally comprises a cylindrical shell or wall 470 pivotally coupled to mounting wall 471 and driven about an axis 472 by a conventionally known drive train. The inner surface of wall 470 includes a plurality of circular rows of depressions having openings or perforations with diameters smaller than the seed being planted so as to retain individual seeds under pressure as drum 464 rotates about axis 472. In the exemplary embodiment illustrated, wall 470 includes eight circular rows of depressions having openings for retaining individual seeds under pressure.

Rollers 466 are rotatably supported along the outside of wall 470 by fork 473, which is biased by spring 474 so as to urge rollers 466 to engagement with wall 470. Rollers 466 are aligned with each of the rows of apertures extending through wall 470. In the exemplary embodiment, rollers 466 comprise eight individual rubbered tire rollers positioned against each of the eight circular rows of apertures extending through wall 470. In operation, rollers 466 close the perforations extending through wall 470 so as to release the individual seeds from the apertures in drum wall 470 such that the released seeds fall into manifold 468.

As best shown by FIG. 11, manifold 468 consists of a plurality of seed receiving tubes or channels that extend adjacent to rollers 466 at one end and that are connected to conveying tubes 436 at the other end. In the exemplary embodiment illustrated, manifold 468 includes eight individual tubes or channels 478 supported so as to receive released seeds from each of the corresponding eight rows of apertures in wall 70 of drum 464. Manifold 468 delivers the released seeds to conveying tubes 436. As shown in FIG. 10, conveying tubes 436 further deliver the seeds to each of the discharge stations 416 spaced along frame 412. In the exemplary embodiment, the seeds are pushed by a cushion of pressurized air through conveying tubes 436 to discharge stations 416. Consequently, meter 434 and conveying tubes 436 meter and dispense seeds to each of discharge stations 416 at a carefully metered flow rate to control the spacing between seeds in each row.

Although meter 434 as illustrated and described is presently preferred, various other alternative structures or mechanisms may also be employed for receiving seed or other particulate agricultural particulate material from hopper 430 and for metering the seed or other particulate agricultural particulate material at a controlled metered rate to discharge stations 416. For example, meter 434 may alternatively be configured for metering seed to any of a number of discharge stations 416. Although meter 434 is illustrated as extending from the rear of hopper 430, meter 434 may alternatively extend from the front of hopper 430 to enable the operator to view meter 434. Furthermore, meter 434 may alternatively be configured to utilize seed carrying plates in lieu of a drum, and may be configured to carry the seeds with the assistance of a negative pressure vacuum or even without the assistance of positive or negative air pressure.

FIGS. 13–17 illustrate flow switching mechanism 432 in greater detail. Flow switching mechanism 432 generally includes gates 480, 482, bearings 484, 486, clamps 488, actuators assemblies 490, 492 and switches 494, 496. Gates 480, 482 generally comprise circular plates or disks having an outer perimeter 498, an eccentric aperture 500 and an eccentric closing portion 502. Perimeters 498 generally include an outer radial portion of each opposing face and an outer circumferential edge extending between the opposing faces of each disk. Perimeters 498 encircle aperture 500 and closing portion 502. Perimeters 498 are configured for being engaged by actuator assemblies 490 and 492 for the rotation of gates 480 and 482, respectively. Each perimeter 498 additionally includes an index member 506 configured to trip one of switches 494 and 496. Index 506 preferably comprises a suitably positioned protrusion extending from perimeter 498 to engage and trip switches 494 and 496 to stop the rotation of its corresponding gate at a preselected angular position relative to conduits 456 and 458.

Aperture 500 extends through disk 497 and is sized less than or equal to the cross sectional area of conduits 456 and 458 at the junction of conduits 456 and 458 and meter 434. When positioned across one of conduits 456, 458, aperture 500 enables seed to flow through aperture 500 into meter 434. In the preferred embodiment, aperture 500 preferably has a semi-circular cross sectional shape.

Closing portion 502 generally comprises a solid, imperforate panel sized greater than or equal to the cross sectional area of conduits 456 and 458 at the junction of conduits 456, 458 and meter 434. Upon being positioned across conduits 456 or 458, closing portion 502 closes and blocks the adjacent conduit to cut off or prevent material within the adjacent conduit from flowing into meter 434.

Figure 17:
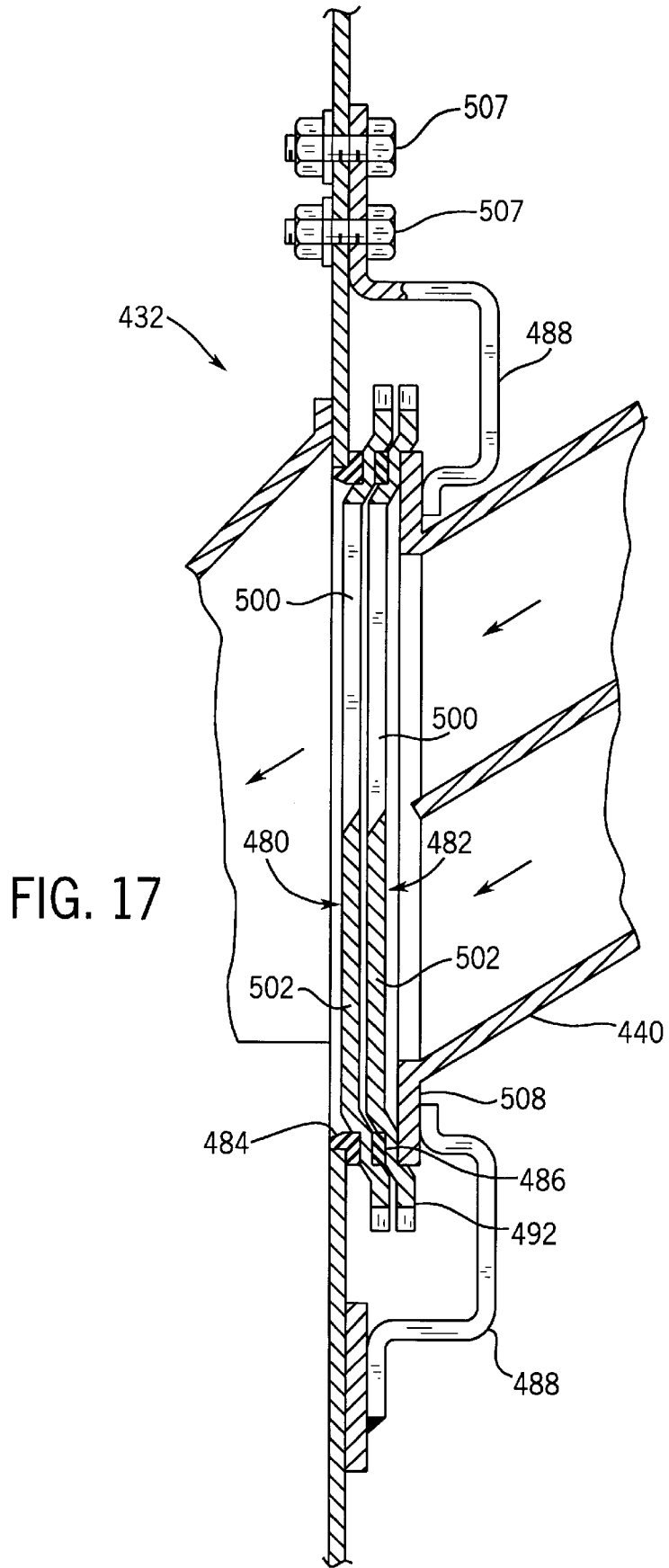
FIG. 17 is a sectional view of the material delivery system of FIG. 14 taken along lines 17—17.

As best shown by FIG. 17, gates 480, 482 are positioned between conduits 456, 458 and interior of meter 434 by bearings 484, 486 and clamps 488. Bearings 484 and 486 generally comprise annular rings of low friction material, such as polytetraflouroethylene, and are configured to provide low friction bearing surfaces against which perimeters 498 of gates 480 and 482 bear against. Bearing 484 is positioned between mounting wall 471 and perimeter 498 of gate 480. Bearing 486 is captured between perimeters 498 of gates 480 and 482. As shown by FIG. 17, perimeters 498 are specifically configured to retain bearings 486 in place without other intervening support structures.

Bearings 484 and 486 enable gates 480 and 482 to be positioned substantially side by side and adjacent to one another and adjacent to mounting wall 471 of meter 434. Because gates 480 and 482 extend parallel to one another and adjacent to mounting wall 471, the space between gates 480, 482 and the interior of meter 434 is reduced. Consequently, the time required for seed or other agricultural particulate material to flow from apertures 500 of gates 480, 482 to the interior of meter 434 is also reduced. By reducing the time necessary for the seed to flow from gates 480, 482 to the interior of meter 434, flow switching mechanism 432 reduces the time necessary to switch between different types of seed or other agricultural particulate material being supplied from compartments 446, 448 through conduits 456, 458, respectively. As a result, mechanism 432 provides for more instantaneous switching and less mixing between different agricultural particulate materials or seed varieties.

Furthermore, when used with control circuit 40 (illustrated in FIG. 1), mechanism 432 enables control circuit 40 to more accurately estimate when gates 480 and 482 must be actuated between first position 28, second position 30 and third position 32. Because gates 480 and 482 are positioned adjacent one another and adjacent to mounting wall 471, gates 480 and 482 are extremely compact and require little additional space between hopper 430, chute 440 and meter 20. As a result, flow switching mechanism 432 may be more easily added to existing planters.

As further shown by FIG. 17, gates 480, 482 and bearings 484, 486 are held in place by clamps 488. Clamps 488 comprise generally rigid brackets fastened to mounting wall 471 with suitable fasteners, such as bolts 507, so as to sandwich gates 480 and 482 and bearings 484, 486 against mounting wall 471. In the exemplary embodiment, clamps 488 engage an outwardly extending flange 508 of chute 440 to hold flange 508 against perimeter 498 of gate 482, which in turn, captures bearing 486, perimeter 498 of gate 480 and bearing 484 against mounting wall 471. Because clamps 488 are removably mounted to mounting wall 471, clamps 488 may be removed to further enable gates 480, 482 and bearings 484, 486 to also be removed for inspection, cleaning and replacement.

Figure 14:
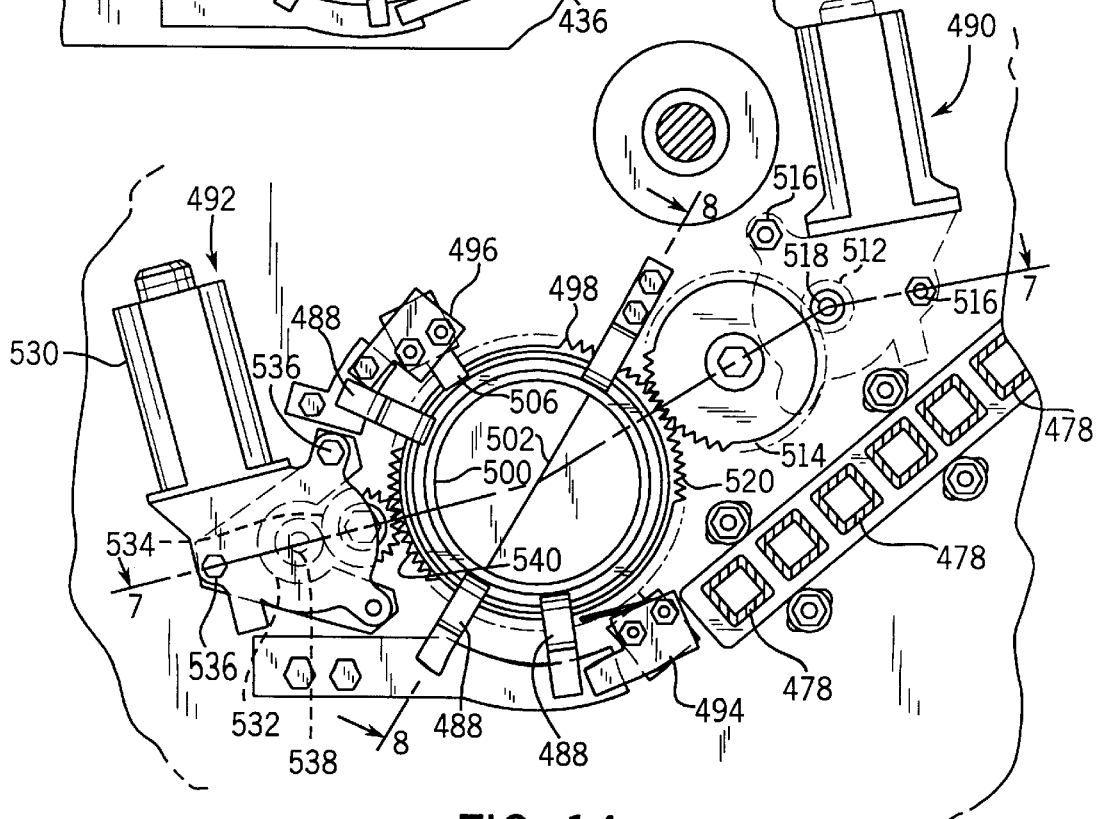
FIG. 14 is an enlarged sectional view of the material delivery system of FIG. 13 with portions removed for purposes of illustration.

As best shown by FIGS. 14 and 16, actuator assemblies 490, 492 are mounted to mounting wall 471 and are configured to rotatably drive gates 480 and 482 between first position 28, second position 30 and third position 32. In particular, actuator assembly 490 is configured to rotatably drive gate 480 while actuator assembly is configured to rotatably drive gate 482. Actuator assembly 490 generally includes motor 510, pinion gear 512 and intermediate gear 514. Motor 510 comprises a conventionally known electric motor bolted to mounting wall 471 by bolts 516. Motor 510 is preferably actuated by a conventionally known solenoid assembly (not shown) electrically coupled to a controller, such as a computer display unit (CDU) (not shown), including a control circuit meter 434 mounted at the operator's station or cab of the vehicle pulling implement 400. The control circuit is substantially identical to control circuit 40, except that the control circuit utilizes the rotational velocity of drum 464 and a pre-estimated or predetermined flow rate of seed into drum 464 through conduits 456 and 458 as a basis for determining when to actuate gates 480 and 482 between the first position in which material is supplied to drum 464 from compartment 446, the second position in which seed is supplied to drum 464 from compartment 448 and the third position in which the flow of seed is stopped from either compartments 446 or 448 into drum 464. Motor 510 includes output shaft 518 which extends through mounting wall 471 is affixedly coupled to a pinion gear 512. Pinion gear 512 engages and rotatably drives gear 514.

Gear 514 is rotatably coupled to mounting wall 471 between pinion gear 512 and perimeter 498 of gate 480. As best shown by FIG. 14, perimeter 498 of gate 480 includes a plurality of teeth 520 along its outer circumferential edge in engagement with gear 512. As a result, rotation of pinion gear 512 by motor 510 rotatably drives gate 480 via intermediate gear 514.

Actuator assembly 492 includes motor 530, pinion gear 532 and intermediate gear 534. Motor 530 is a conventionally known electric motor bolted to mounting wall 471 by bolts 536 on an opposite side of mounting wall 471 as motor 510. Motor 530 is actuated by a conventionally known solenoid assembly which is electrically coupled to the controller, such as a computer display unit (CDU) (not shown), including a control circuit. The control circuit is substantially identical to control circuit 40, except that the control circuit utilizes the rotational velocity of drum 464 and a pre-estimated or predetermined flow rate of seed into drum 464 through conduits 456 and 458 as a basis for determining when to actuate gates 480 and 482 between the first position in which material supplied to drum 464 of meter 434 from compartment 446, the second position in which seed is supplied from compartment 448 to meter 434 and the third position in which gates 480 and 482 are actuated to stop the flow of seed from either compartments 446 or 448 into meter 434 mounted at the operator's station or cab of the vehicle pulling implement 400. Motor 530 includes an output shaft 538 affixedly coupled to pinion gear 532 so as to rotatably drive pinion gear 532. Pinion gear 532, in turn, rotatably drives intermediate gear 534.

Intermediate gear 534 is rotatably coupled to mounting wall 471 between pinion gear 532 and perimeter 498 of gate 482. As further shown by FIG. 14, the outer circumferential surface of perimeter 498 of gate 482 includes teeth 540 engaging intermediate gear 534. As a result, rotation of pinion gear 532 by motor 530 rotatably drives gate 482 via intermediate gear 532 to selectively position aperture 500 and closing portion 502 of gate 482 relative to conduits 456 and 458.

Switches 494 and 496 comprise conventionally known mechanical switches mounted to mounting wall 471 adjacent to gates 480 and 482, respectively, for engagement with indexes 506. Switches 494 and 496 are electrically coupled to motors 510 and 530, respectively, and are configured to generate a cut-off signal to motors 510 and 530 to stop continued rotation of gates 480 and 482, respectively. Switches 494 and 496 provide feedback to motors 510 and 530 regarding the angular position of gates 480 and 482 so that aperture 500 and closing portions 502 may be properly aligned relative to conduits 456 and 458 in the first position in which gates 480 and 482 open conduit 456 and conduit 458 to supply seed from compartment 446 to meter 434, a second position in which gates 480 and 482 open conduit 458 and close conduit 456 to supply seed from compartment 448 to meter 434, and a third position in which gates 480 and 482 close both conduits 456 and 458 to prevent seed from either compartments 446 or 448 from entering meter 434.

As will be appreciated, various other position detecting and regulating mechanisms may be used with motors 510 and 530 to position gates 480 and 482 in proper angular alignment with conduits 456 and 458. For example, in place of switches 494 and 496, flow switching mechanism 432 may alternatively include other sensing devices, including optical, mechanical and electrical sensing devices, which sense the angular position of gates 480 and 482. Furthermore, instead of utilizing distinct sensing devices for sensing the position of gates 480 and 482, flow switching mechanism 432 may alternatively utilize conventionally known servo motors in place of motors 510 and 530 to precisely control and regulate the angular positioning of gates 480 and 482.

Overall, material delivery system 410 enables the operator to switch between different varieties or blends of seed being planted without stopping or otherwise interrupting the continuous planting of seed and without substantial mixing of the different blends or varieties of seed during the change overs. Because flow switching mechanism 432 is actuatable between a first position in which flow switching mechanism 432 supplies a first variety of seed from compartment 446, a second position in which flow switching mechanism 432 supplies a second variety or blend of agricultural material from compartment 448 to meter 434 and a third position in which flow switching mechanism 432 stops the supply or flow of seed from either compartment 446 or 448 to meter 434, flow switching mechanism 432 enables existing seed within meter 434 to be substantially exhausted from meter 434 before meter 434 is supplied with a different type or blend of seed. Because flow switching mechanism 432 extends adjacent to sidewall and interior of meter 434, the time necessary to switch between different types or blends of seed is reduced to provide for more instantaneous switching and less mixing between different types of seeds. Furthermore, when additionally equipped with sensor 38 and control circuit 40 (illustrated and described with respect to FIG. 1), material delivery system 410 provides precise control and monitoring of the amount of seed within meter 434 to more accurately control the supply of different seeds to meter 434 without undesirable mixing as the supply of seed to meter 434 is switched and without premature exhaustion of seed from meter 434 which results in unplanted areas of the field. Thus, material delivery system 410 enables more precise, site-specific or prescription farming.

Although the present invention has been described with reference to preferred embodiments, workers skilled in the art will recognize that changes may be made in form and detail without departing from the spirit and scope of the invention. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. An agricultural particulate material delivery system for delivering metered agricultural particulate material to a growing medium, the system comprising:

first and second compartments adapted to contain different agricultural particulate materials;

a material meter having an interior, wherein the meter is configured to thinly distribute the particulate material over the growing medium;

a flow switching mechanism between the first and second compartments and the meter, wherein the flow switching mechanism is actuatable between a first position in which the flow switching mechanism supplies material from the first compartment to the interior of the meter, a second position in which the flow switching mechanism supplies material from the second compartment to the interior of the meter, and a third position in which the flow switching mechanism stops the supply of material from both the first and second compartments to the interior of the meter;

an actuator coupled to the flow switching mechanism;

a sensor proximate the interior of the material meter, wherein the sensor is configured to generate a material signal representing an amount of material within the meter; and a control circuit coupled between the actuator and the sensor, wherein the control circuit is configured to generate a control signal for moving the actuator to actuate the flow switching mechanism between the first, second and third positions based upon the sensed amount of material within the meter.

2. The system of claim 1, wherein the material meter is configured to meter material to a plurality of rows in the growing medium.

3. The system of claim 2 including:

a plurality of chutes extending from the interior of the meter, wherein the plurality of chutes deliver metered material to each of the plurality of rows.

4. The system of claim 1, wherein the flow switching mechanism includes:

first and second conduits communicating between the first and second compartments, respectively, and the interior of the meter;

a gate mechanism between the first and second compartments and the interior of the material meter, wherein the gate mechanism is actuatable between a first position in which the flow switching mechanism supplies material from the first compartment to the interior of the meter, a second position in which the flow switching mechanism supplies material from the second compartment to the interior of the meter, and a third position in which the flow switching mechanism stops the supply of material from both the first and second compartments to the interior of the meter.

5. The system of claim 4, wherein the gate mechanism includes:

a first gate between the first compartment and the interior of the meter, wherein the first gate is selectively movable between a first position in which the first gate closes the first conduit and a second position in which the first conduit is opened.

6. The system of claim 5, wherein the first gate closes the second conduit in the second position.

7. The system of claim 5, wherein the first gate rotates between the first and second positions.

8. The system of claim 5, wherein the first gate is configured for being rotated about an axis and includes a circular disk having an outer perimeter, wherein the disk includes an eccentric aperture and an eccentric closing portion, and wherein rotation of the disk alternately positions the eccentric aperture and the eccentric closing portion across the first conduit.

9. The system of claim 8, including means in engagement with the outer perimeter of the disk for rotating the disk about the axis.

10. The system of claim 9, wherein the outer circumference includes a plurality of teeth and wherein the means for rotating the disk includes a rotatably driven gear in engagement with the plurality of teeth.

11. The system of claim 5, including an actuator coupled to the first gate to selectively move the first gate between the first and second positions.

12. The system of claim 5, including a motor operatively coupled to the first gate to selectively move the first gate between the first and second positions.

13. The system of claim 5, including:
a second gate between the second compartment and the meter, wherein the second gate is selectively moveable between a third position in which the second gate closes the second conduit and a fourth position in which the second conduit is open.

14. The system of claim 13, wherein the second gate rotates between the third and fourth positions.

15. The system of claim 13, wherein the second gate is configured for being rotated about a second axis and includes a circular disk having an outer circumference, wherein the disk includes an eccentric aperture and an eccentric closing portion, wherein rotation of the disk alternately positions the eccentric aperture and the eccentric closing portion across the second conduit.

16. The system of claim 15, including means in engagement with the outer circumference of the second circular disk for rotating the disk about the second axis.

17. The system of claim 16, wherein the outer circumference includes a plurality of teeth and wherein the means for rotating the disk includes a rotatably driven gear in engagement with the plurality of teeth.

18. The system of claim 13, including an actuator coupled to the second gate for selectively moving the gate between the third and fourth positions.

19. The system of claim 13, including a second motor operatively coupled to the second gate for selectively moving the second gate between the third and fourth positions.

20. The system of claim 13, wherein the first and second gates rotate about the same axis such that the first and second gates overlap.

21. The system of claim 4, wherein the gate mechanism extends adjacent the meter.

22. The system of claim 5, wherein the first gate extends adjacent the meter.

23. The system of claim 4, including a tube extending from the meter to deliver metered material to the growing medium.

24. The system of claim 1, wherein the meter is configured to meter seed.

25. The system of claim 4, including:
a bifurcated hopper providing the first and second compartments; and
a bifurcated tube providing the first and second conduits.

26. An agricultural particulate material delivery system for delivering metered agricultural particulate material to a growing medium, the system comprising:
first and second compartments adapted to contain different materials;
a material meter having an interior, wherein the meter is configured to distribute the particulate material in substantially a single layer in or on the growing medium;
first and second conduits communicating between the first and second compartments, respectively, and the interior of the meter;
a first gate between the first compartment and the meter, wherein the first gate is selectively moveable between a first position in which the first gate closes the first conduit and a second position in which the first conduit is opened;
a second gate between the second compartment and the meter, wherein the second gate is selectively movable between a third position in which the second gate closes the second conduit and a fourth position in which the second conduit is open;
at least one actuator coupled to first and second gates for selectively moving the first gate between the first and second positions and for selectively moving the second gate between the third and fourth positions;
means for determining when material within the meter will be exhausted from the interior and for generating a control signal representing a time at which the material will be exhausted from the interior of the meter; and
means for controlling said at least one actuator to selectively move the first gate between the first and second positions and the second gate between the third and fourth positions based upon the control signal.

27. A planter for delivering seed to a plurality of rows, the planter comprising:
a frame;
a plurality of ground engaging motive members coupled to the frame for supporting the frame above the ground being worked;
at least one hopper coupled to the frame and providing first and second compartments adapted to contain seed;
a material meter coupled to the frame and having an interior, the meter adapted to meter seed to at least one row of a plurality of rows;
first and second conduits communicating between the first and second compartments, respectively, and the interior of the meter;
a gate mechanism between the first and second compartments and the meter, the gate mechanism being configured to selectively open and close the first and second conduits to selectively deliver seed from the first and second compartments, respectively, to the meter;
an actuator coupled to the gate mechanism; and
a control circuit coupled to the actuator, wherein the control circuit is configured to determine when the material within the meter will be exhausted from the interior and to generate a control signal representing a time at which the material will be exhausted from the interior of the meter, whereby the actuator actuates the gate mechanism to selectively open and close the first and second conduits based upon the control signal.

28. The planter of claim 27 including a sensor proximate the interior of the material meter, wherein the sensor is configured to generate a material signal representing an amount of material within the meter and wherein the control circuit generates the control signal based upon the material signal.

29. An agricultural particulate material delivery system for delivering metered agricultural particulate material to a growing medium, the system comprising:
first and second compartments adapted to contain different agricultural particulate materials;
a material meter having an interior;
a flow switching mechanism between the first and second compartments and the meter, wherein the flow switching mechanism is actuable between a first position in which the flow switching mechanism supplies material from the first compartment to the interior of the meter, a second position in which the flow switching mechanism supplies material from the second compartment to the interior of the meter, and a third position in which the flow switching mechanism stops the supply of material from both the first and second compartments to the interior of the meter;

an actuator coupled to the flow switching mechanism;

a sensor proximate the interior of the material meter, wherein the sensor is configured to generate a material signal representing an amount of material within the meter; and a control circuit coupled between the actuator and the sensor, wherein the control circuit is configured to generate a control signal for moving the actuator to actuate the flow switching mechanism between the first, second and third positions based upon the sensed amount of material within the meter.

30. The system of claim 29 including a location signal generation circuit configured to provide location data regarding the system, wherein the control circuit generates the control signal based upon the location data.

31. The system of claim 30 including a memory storage device configured to store geo-referenced data relating to locations of the growing medium, wherein the control circuit generates the control signal based upon the geo-referenced data.

32. The system of claim 31 including a sensor proximate the interior of the material meter, wherein the sensor is configured to generate a material signal representing an amount of material within the meter and wherein the control circuit generates the control signal based upon the material signal.

33. The system of claim 31 including means for providing flow rate data regarding at least one of a flow rate of material to the meter and a flow rate of material from the meter, wherein the control circuit generates the control signal based upon the flow rate data.

34. The system of claim 32 wherein the means for providing flow rate data includes at least one sensor.

35. The system of claim 32 wherein the means for providing flow rate data includes a memory storage device.

36. The system of claim 32 wherein the means for providing flow rate data includes operator input means.

37. The system of claim 31 including a location signal generation circuit configured to provide location data regarding the system, wherein the control circuit generates the control signal based upon the location data.

38. The system of claim 31 including a memory storage device configured to store geo-referenced data relating to locations of the growing medium, wherein the control circuit generates the control signal based upon the geo-referenced data.

39. The system of claim 31 including means for distributing the particulate material in substantially a single layer in or on the growing medium.

40. The system of claim 31 wherein the third position for the flow switching mechanism is preferably situated between the first position and the second position such that the flow switching mechanism must be actuated past the third position when switching or alternating between the first position and the second position.

41. An agricultural particulate material delivery system for delivering metered agricultural particulate material to a growing medium, the system comprising:

first and second compartments adapted to contain different agricultural particulate materials;

a material meter having an interior;

a flow switching mechanism between the first and second compartments and the meter, wherein the flow switching mechanism is actuable between a first position in which the flow switching mechanism supplies material from the first compartment to the interior of the meter, a second position in which the flow switching mechanism supplies material from the second compartment to the interior of the meter, and a third position in which the flow switching mechanism stops the supply of material from both the first and second compartments to the interior of the meter;

an actuator coupled to the flow switching mechanism; and a control circuit coupled to the actuator, wherein the control circuit is configured to determine when the material within the meter will be exhausted from the interior and to generate a control signal representing a time at which the material will be exhausted from the interior of the meter, whereby the actuator actuates the flow switching mechanism between the first, second and third positions in response to the control signal.

42. An agricultural particulate material delivery system for delivering metered agricultural particulate material to a growing medium, the system comprising:

first and second compartments adapted to contain different agricultural particulate materials;

a material meter having an interior;

a flow switching mechanism between the first and second compartments and the meter, wherein the flow switching mechanism is actuable between a first position in which the flow switching mechanism supplies material from the first compartment to the interior of the meter, a second position in which the flow switching mechanism supplies material from the second compartment to the interior of the meter, and a third position in which the flow switching mechanism stops the supply of material from both the first and second compartments to the interior of the meter;

an actuator coupled to the flow switching mechanism; and a control circuit including means for determining a time at which the flow switching mechanism must be actuated between the first position, the second position and the third position to switch delivery of material to the meter from the first compartment to/from the second compartment without substantial mixing of materials from the first and second compartments in the interior of the meter and without the interior of the meter being exhausted of material from both the first compartment and the second compartment while the flow switching mechanism is in the third position.

43. The system of claim 42 including means for visually displaying the time.

44. The system of claim 42 including the control circuit for generating a control signal based upon the determined time, wherein the actuator actuates the flow switching mechanism between the first position, the second position and the third position based upon the control signal.

45. The system of claim 42 wherein the means for determining includes means for calculating the amount of time until the material within the meter is exhausted.

46. The system of claim 42 wherein the means for determining includes means for calculating a distance traveled until the exhaustion of material from the meter.

47. An agricultural particulate material delivery system for delivering metered agricultural particulate material to a growing medium, the system comprising:

first and second compartments adapted to contain different agricultural particulate materials;

a material meter having an interior, wherein the meter is configured to thinly distribute the particulate material over the growing medium; and a flow switching mechanism between the first and second compartments and the meter, wherein the flow switching mechanism is actuatable between a first position in which the flow switching mechanism supplies material from the first compartment to the interior of the meter, a second position in which the flow switching mechanism supplies material from the second compartment to the interior of the meter, and a third position in which the flow switching mechanism stops the supply of material from both the first and second compartments to the interior of the meter, wherein the flow switching mechanism includes:

first and second conduits communicating between the first and second compartments, respectively, and the interior of the meter; and a gate mechanism between the first and second compartments and the interior of the material meter, wherein the gate mechanism is actuatable between a first position in which the flow switching mechanism supplies material from the first compartment to the interior of the meter, a second position in which the flow switching mechanism supplies material from the second compartment to the interior of the meter, and a third position in which the flow switching mechanism stops the supply of material from both the first and second compartments to the interior of the meter, wherein the gate mechanism includes:

a gate between the first compartment and the interior of the meter, wherein the gate is selectively movable between a first position in which the gate closes the first conduit and a second position in which the first conduit is opened, wherein the gate closes the second conduit in the second position.

48. An agricultural particulate material delivery system for delivering metered agricultural particulate material to a growing medium, the system comprising:

first and second compartments adapted to contain different agricultural particulate materials;

a material meter having an interior, wherein the meter is configured to thinly distribute the particulate material over the growing medium; and a flow switching mechanism between the first and second compartments and the meter, wherein the flow switching mechanism is actuatable between a first position in which the flow switching mechanism supplies material from the first compartment to the interior of the meter, a second position in which the flow switching mechanism supplies material from the second compartment to the interior of the meter, and a third position in which the flow switching mechanism stops the supply of material from both the first and second compartments to the interior of the meter, wherein the flow switching mechanism includes:

first and second conduits communicating between the first and second compartments, respectively, and the interior of the meter; and a gate mechanism between the first and second compartments and the interior of the material meter, wherein the gate mechanism is actuatable between a first position in which the flow switching mechanism supplies material from the first compartment to the interior of the meter, a second position in which the flow switching mechanism supplies material from the second compartment to the interior of the meter, and a third position in which the flow switching mechanism stops the supply of material from both the first and second compartments to the interior of the meter, wherein the gate mechanism includes:

a gate between the first compartment and the interior of the meter, wherein the gate is selectively movable between a first position in which the gate closes the first conduit and a second position in which the first conduit is opened, wherein the gate is configured for being rotated about an axis and includes a circular disk having an outer perimeter, wherein the disk includes an eccentric aperture and an eccentric closing portion, and wherein rotation of the disk alternately positions the eccentric aperture and the eccentric closing portion across the first conduit.

49. An agricultural particulate material delivery system for delivering metered agricultural particulate material to a growing medium, the system comprising:

a bifurcated hopper providing first and second compartments adapted to contain different agricultural particulate materials;

a material meter having an interior, wherein the meter is configured to thinly distribute the particulate material over the growing medium; and a flow switching mechanism between the first and second compartments and the meter, wherein the flow switching mechanism is actuatable between a first position in which the flow switching mechanism supplies material from the first compartment to the interior of the meter, a second position in which the flow switching mechanism supplies material from the second compartment to the interior of the meter, and a third position in which the flow switching mechanism stops the supply of material from both the first and second compartments to the interior of the meter, wherein the flow switching mechanism includes:

a bifurcated tube providing first and second conduits communicating between the first and second compartments, respectively, and the interior of the meter; and a gate mechanism between the first and second compartments and the interior of the material meter, wherein the gate mechanism is actuatable between a first position in which the flow switching mechanism supplies material from the first compartment to the interior of the meter, a second position in which the flow switching mechanism supplies material from the second compartment to the interior of the meter, and a third position in which the flow switching mechanism stops the supply of material from both the first and second compartments to the interior of the meter.

* * * * *